Sept. 26, 1933.  L. R. MYERS ET AL  1,927,898
BRAKE TOOL
Filed April 14, 1931    3 Sheets-Sheet 1
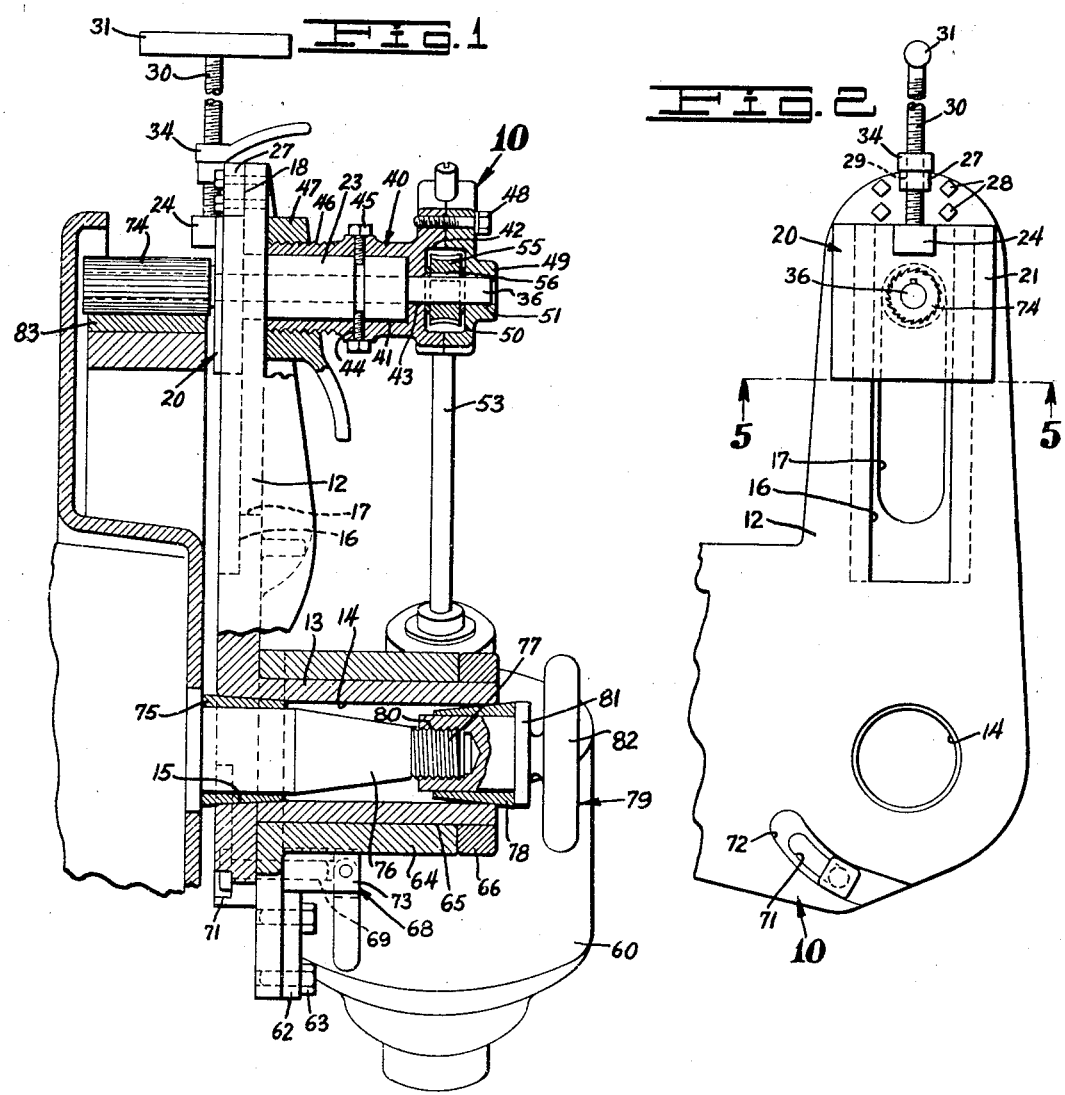
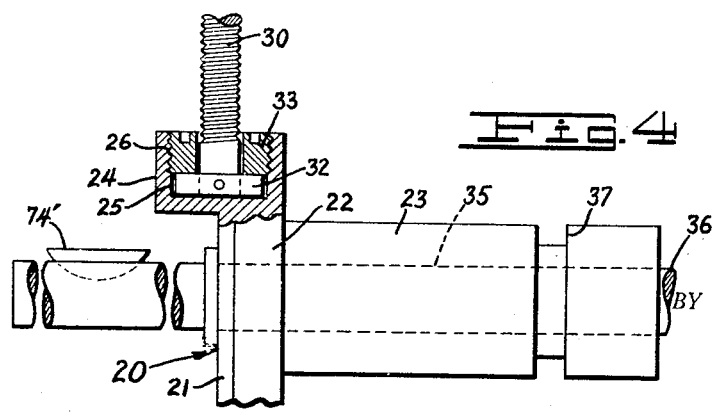
INVENTORS.
LESLIE R. MYERS.
OSCAR MAYER.
BY
B. J. Craig,
ATTORNEY.

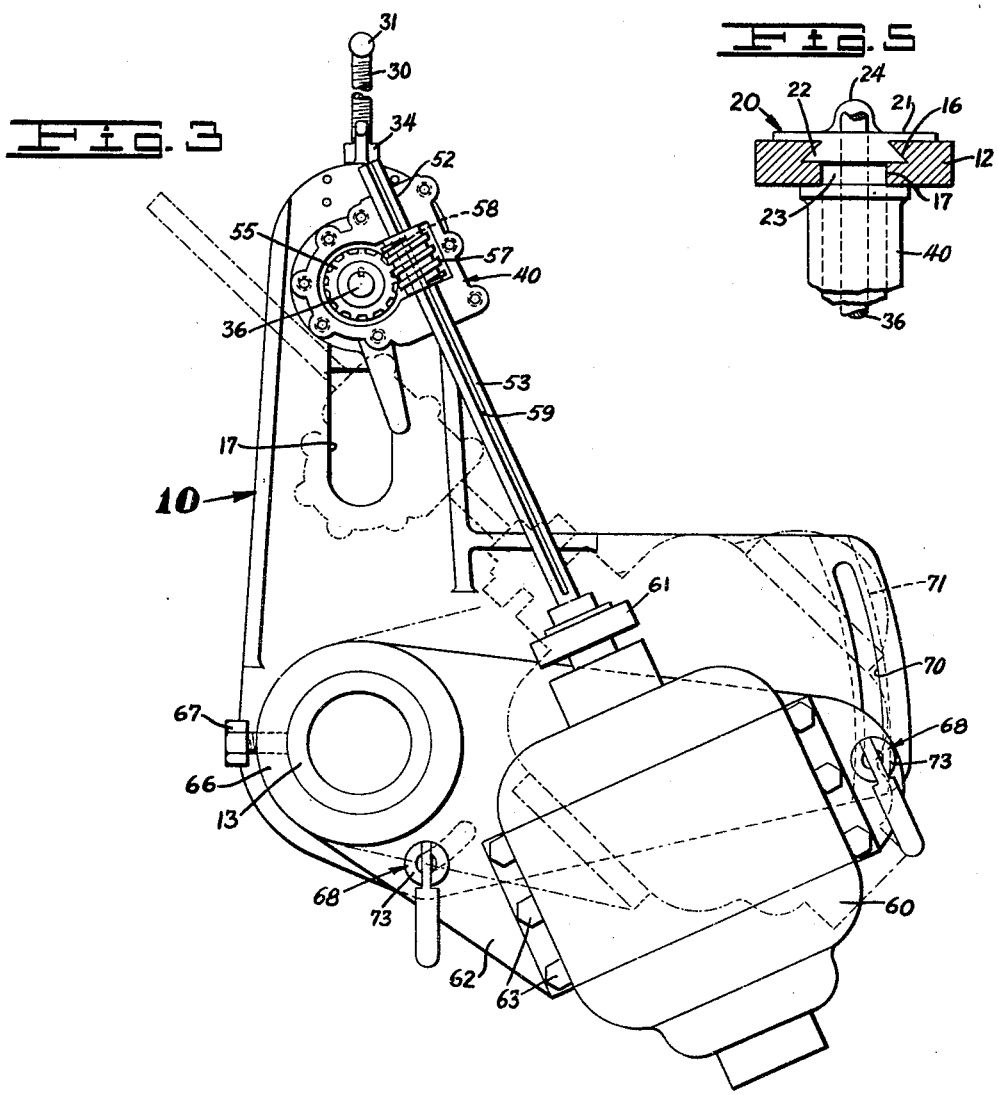

Sept. 26, 1933.  L. R. MYERS ET AL  1,927,898
BRAKE TOOL
Filed April 14, 1931   3 Sheets-Sheet 3
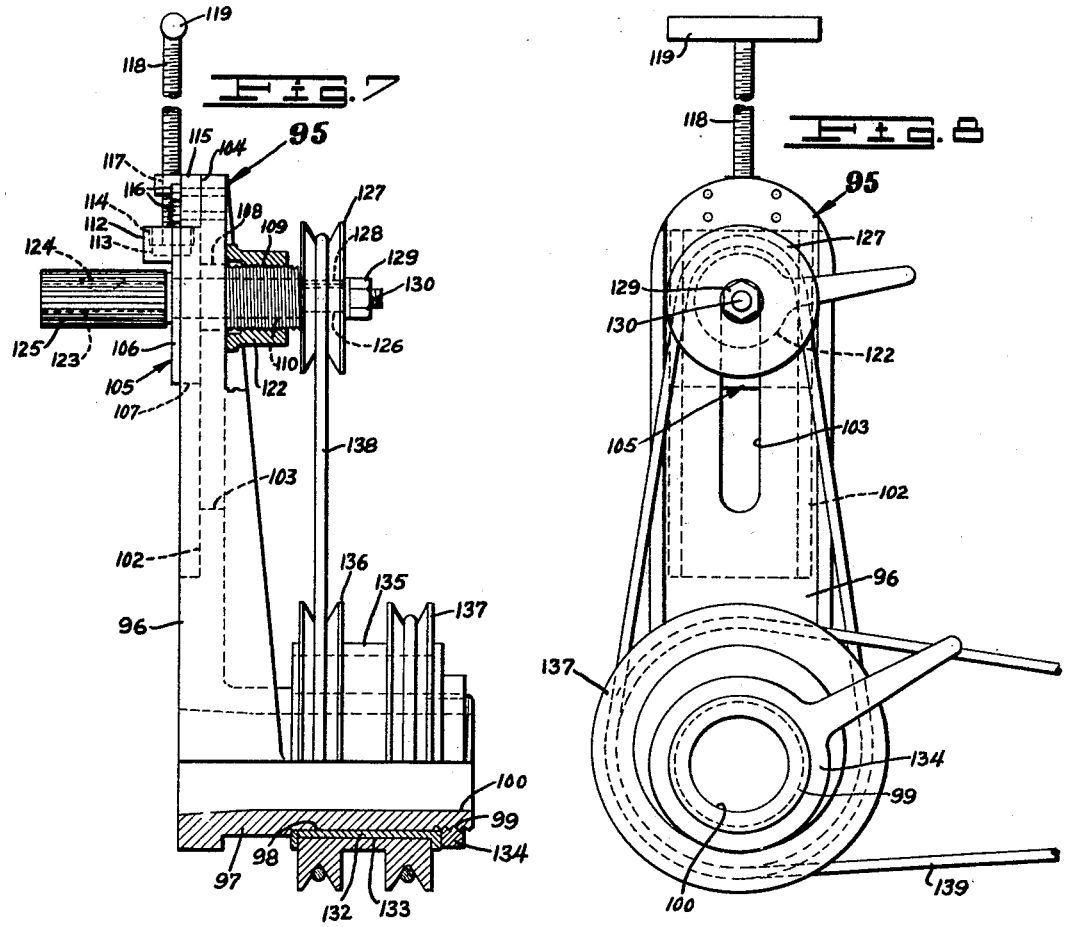
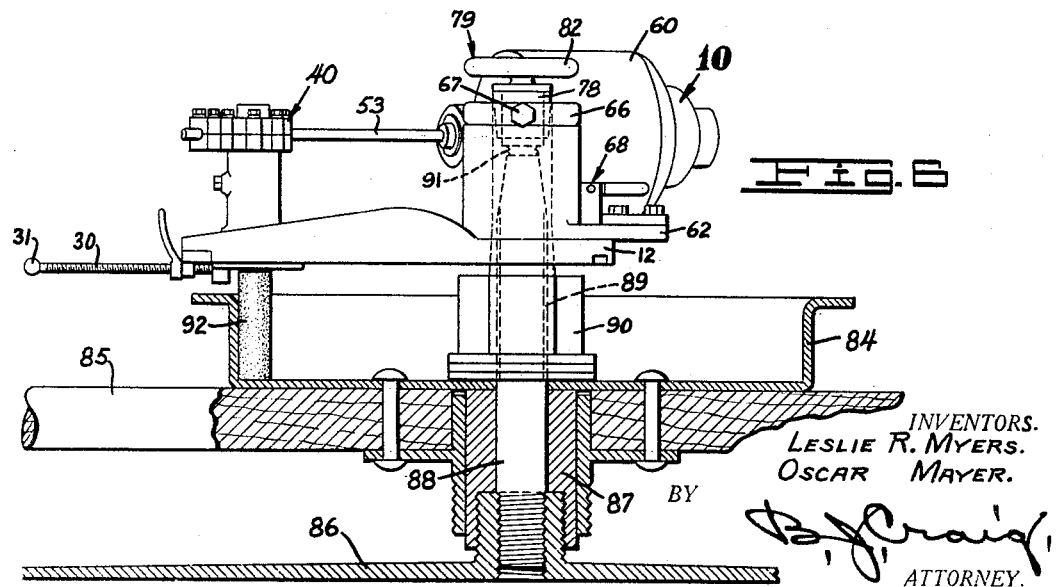
INVENTORS.
LESLIE R. MYERS.
OSCAR MAYER.
BY
ATTORNEY.

Patented Sept. 26, 1933

1,927,898

UNITED STATES PATENT OFFICE 1,927,898

BRAKE TOOL

Leslie R. Myers and Oscar Mayer, Whittier, Calif.

Application April 14, 1931. Serial No. 529,997

13 Claims. (Cl. 90—12)

This invention relates to improvements in brake tools.

The general object of this invention is to provide an improved tool which is adapted to be used to true up brake bands and brake drums.

Another object of the invention is to provide a tool of the class described which is adapted to operate on a brake band without removing the brake band from its mounting.

A further object of the invention is to provide improved means for mounting a tool in position to operate on a brake band.

Still another object of the invention is to provide improved means for mounting a tool in a position to operate on a brake drum.

Other objects and advantages of this invention will be apparent from the following description taken in connection with the accompanying drawings wherein:

Fig. 1 is a side elevation of our improved brake tool showing it partly in section and operatively mounted to work upon a brake band.

Fig. 2 is a fragmentary face view of the tool.

Fig. 3 is a rear view of the tool.

Fig. 4 is an enlarged fragmentary side elevation of a portion of the tool with parts thereof broken away.

Fig. 5 is a section taken on line 5—5 of Fig. 2.

Fig. 6 is a side elevation of the tool on a reduced scale showing it operatively mounted to work on a brake drum.

Fig. 7 is a side elevation partly in section of a modified form of brake tool, and Fig. 8 is a rear view of the brake tool shown in Fig. 7.

Referring to the drawings by reference characters we have indicated our improved brake tool generally at 10. As shown the tool 10 comprises a base 12 having a rearwardly extending boss 13 thereon in which an aperture 14 is provided. A portion of the aperture 14 adjacent the front of the device is tapered as indicated at 15. In the front of the base 12 we provide a dovetailed groove 16 and an elongated aperture 17 which communicates with the groove 16 and opens through the rear of the base. Adjacent the outer end of the groove 16 we provide a recessed portion 18 in the front of the base 12.

Mounted on the front of the base 12 we provide a tool carrying member 20 which includes a plate portion 21 which overlays the front of the base 12, a dovetailed portion 22 which is positioned in the dovetailed groove 16 and a sleeve 23 which is positioned in the elongated aperture 17 and extends rearwardly from the base. Extending from the plate portion 21 of the member 20 we provide a housing 24 having a recess 25 therein which is partly threaded as indicated at 26. (See Fig. 4.) Positioned in the recess 18 of the base 12 we provide a bracket 27 which is secured to the base by a plurality of bolts 28 and includes a threaded aperture 29 in which a threaded stem 30 is positioned.

The stem 30 is provided at one end with a cross bar handle 31 and at the opposite end with an enlarged head 32 which is positioned in the recess 25 in the housing 24 of the tool holding member 20. For retaining the head 32 in the recess 25 we provide a nut 33 which surrounds the stem 30 and engages the threads 26 of the housing 24 and for retaining the stem 30 in a set position we provide a lock nut 34.

The tool carrying member 20 is provided with a bore 35 in which a shaft 36 is positioned and the sleeve 23 of the member 20 is provided with an outer annular groove 37 intermediate its length. Positioned on the sleeve 23 of the tool carrying member 20 we provide a gear housing 40 which includes a recess 41 in which the sleeve 23 is positioned, a gear recess 42 and a bore 43 which communicates with the two recesses and in which the shaft 36 is positioned.

In the housing 40 we provide a plurality of threaded apertures 44 in which bolts 45 are positioned. The ends of the bolts 45 are positioned in the annular groove 37 of the sleeve 23 of the tool carrying member 20 thereby preventing relative axial movement between the housing 40 and the sleeve 23 but allowing free rotation of the housing on the sleeve.

On the end of the housing 40 adjacent the base 12 we provide threads 46 and on which a similarly threaded locking nut 47 is positioned. When the nut 47 is rotated to move towards the base 12 it engages the base and through the medium of the housing 40 and the bolts 45 tightly clamps the tool carrying member in a set position.

Secured to the gear housing 40 by a plurality of bolts 48 we provide a cover 49 which is provided with a gear recess 50 and a bore 51 in which the shaft 36 is positioned. In the gear housing 40 and the cover 49 we provide bores 52 in which a shaft 53 is positioned.

Positioned in the gear recess 42 of the housing 40 and the gear recesses 50 of the cover 49 we provide a worm gear 55 which is secured to the shaft 36 by a key 56 and meshes with a worm pinion 57 which is positioned on and secured to the shaft 53.

The worm pinion 57 is free to move axially along the shaft 53 and is connected for rotary movement with the shaft 53 by a key 58 which is positioned in an elongated keyway 59 provided in the shaft 53.

The shaft 53 is shown as connected to the armature shaft of a motor 60 through the medium of a universal joint 61 which may be of any desired construction. The motor 60 is secured to a plate 62 by a plurality of bolts 63 and the plate 62 is provided with a hub 64 having an aperture 65 therein in which the boss 13 of the base 12 is positioned. To retain the hub 64 in position on the boss 13 we provide a collar 66 which is positioned on the boss 13 and secured thereto by a set screw 67.

For securing the plate 62 in a set position we provide a plurality of clamping members 68 each of which include a bolt 69 positioned in an arcuate aperture 70 provided in the boss 12. The heads of each of the bolts 69 are positioned in an arcuate recess 71 in the base 12 and the shanks thereof extend through the apertures 70 in the base and through apertures 72 provided in the plate 62 and are engaged by threaded nut members 73.

When it is desired to true up the brake band of an internal expanding brake with our device 10 the associated wheel is removed and the device 10 is positioned on the axle in place of the wheel. A cutting tool is then positioned on the shaft 36 and may be secured thereto by a key 74' or in any other suitable manner.

In Fig. 1 we have shown one means by which the device 10 may be secured in position to operate on a brake band. As shown a tapered sleeve 75 is positioned on the axle 76 and then the device 10 is positioned on the sleeve 75 with the sleeve 75 engaging the tapered portion 15 of the aperture 14 in the base 12. In this position the threaded end 77 of the axle 76 is positioned in the apertures 14 of the device adjacent the rear end of the boss 13. A tapered sleeve 78 is then positioned in the aperture 14 and a nut member 79 is positioned in the sleeve 78. The nut member 79 includes a threaded recess 80 in which the threaded end 77 of the axle 76 is positioned, a sleeve engaging flange 81 which engages the end of the sleeve 78 and a handle portion 82. When the member 79 is rotated to move it towards the base 12 it frictionally clamps the device 10 on the tapered sleeves 75 and 78. The lock nuts 34 and 47 and the clamping member 73 are backed up and the tool carrying member is moved to the desired position by rotating the threaded stem 30 in one direction or the other.

After the tool carrying member has been moved to the desired position the lock nuts 34 and 47 are again tightened to lock the tool carrying member in position. At the same time the tool carrying member 20 is moved the motor 60 is likewise moved to retain the shaft 53 in correct relationship to the gears. After the motor has been moved to the correct position the motor plate 62 is secured in position by the clamping members 73. The motor 60 is then put in operation to rotate the cutter 74 through the medium of the shafts 53, the gears 55 and 57 and the shaft 36. As the cutter 74 rotates and acts to cut on a brake band such as indicated at 83 the operator manually rotates the entire device about the axis of the axle 76 while the motor is operating, thereby correctly shaping the outer surface of he brake band 83 to a true arc about the axis of the axle.

In Fig. 6 we have shown the device 10 as operating to true up the inside of a brake drum 84 which is secured to a wheel 85. The wheel 85 is positioned on a jig 86 which includes a removable bushing 87 which is adapted to fit within the hub of the wheel, and a removable spindle 88 which includes a threaded portion 89 on which a nut 90 is positioned to clamp the wheel to the jig. The spindle 88 further includes a reduced threaded portion 91 by means of which the device 10 is secured to the spindle 88 in the same manner as it is to the axle 76 as previously described.

Instead of using the cutting tool 74 an emery hub 92 is preferably used to true up the inside of a brake drum but it will be understood that any desired tool may be used on the shaft 36.

The tool carrier 20 and the motor 60 are adjusted to the desired position in the same manner as previously described and after starting the motor the operator manually rotates the entire device 10 about the axis of the spindle 88 thereby correctly shaping the brake drum to a correct arc about the axis of the wheel.

In Figs. 7 and 8 we have indicated a modified form of our device generally at 95. As shown the device 95 comprises a base 96 having a rearwardly extending boss 97 thereon which includes a bearing portion 98 and a threaded end portion 99 and has an aperture 100 therein. In the front of the base 96 we provide a dovetailed groove 102 and an elongated aperture 103 which communicates with the groove 102 and opens through the rear of the base. Adjacent the outer end of the groove 103 we provide a recessed portion 104 in the front of the base 96.

Mounted on the front of the base we provide a tool carrying member 105 which is similar to the tool carrying member 20 of the device 10. The tool carrying member 105 includes a plate portion 106 which overlays the front of the bar 96, a dovetailed portion 107 which is positioned in the dovetailed groove 102 and a sleeve 108 which is positioned in the elongated aperture 103 and extends rearwardly from the base. The sleeve 108 is externally threaded as at 109 and is provided with a bore 110.

Extending from the plate portion 106 of the member 105 we provide a housing 112 having a recess 114 therein which has its upper portion threaded. Positioned in the recess 104 of the base 96 we provide a bracket 115 which is secured to the base by a plurality of bolts 116 and includes a threaded aperture 117 in which a threaded stem 118 is positioned.

The stem 118 is provided at one end with a cross bar handle 119 and at the opposite end with an enlarged head 113 which is positioned in the lower unthreaded portion of the recess 114 of the housing 112 of the tool carrying member 105. For retaining the tool carrying member in an adjusted position we provide a lock nut 122 which engages the threads 109 on the sleeve 108.

Positioned in the aperture 110 of the device 108 we provide a shaft 123 adjacent one end of which we secure thereto as by a key 124 a cutting tool 125. Adjacent the opposite end of the shaft 123 includes a reduced portion 126 on which a pulley 127 is positioned. The pulley 127 is secured to the shaft by a key 128 and a nut 129 which engages the threads of a threaded portion 130 of the shaft.

Positioned on the bearing portion 98 of the boss 97 we provide a bearing sleeve 132 which is rotatable on the bearing portion 98 and includes an outer bearing surface 133 which is eccentric to the bearing portion 98 of the boss. For securing the bearing sleeves 132 in an adjusted position on the boss we provide a lock nut 134 which is positioned on the threaded portion 99 of the boss.

Positioned on the bearing sleeve 132 and rotatable on the bearing surface 133 thereof we provide a sleeve 135 having a pair of pulleys 136 and 137 integral therewith. The pulley 136 is operatively connected to the pulley 127 on the shaft 123 by a belt 138 and the pulley 137 is adapted to be driven by a belt 139 from a suitable source of power.

When it is desired to true up a brake band with the device 95 it is secured to the associated axle in the same manner as previously described in connection with the device 10. The tool carrying member 105 is then moved to the desired position by rotating the stem 118 in the correct direction and the tool carrying member is then secured in the adjusted position by the lock nut 122. When the tool carrying member 105 is moved an excessive distance the belt 138 is replaced by another to compensate for the difference in distance between the pulley 127 and the pulley 136 but when the tool carrying member 105 is moved only a short distance the lock nut 134 is backed up and the sleeve 132 is rotated on the boss.

As the sleeve 132 is thus rotated it moves the pulley 136 either closer or farther away from the pulley 127 thereby maintaining the same distance between the two pulleys so that the same belt 138 may be used. After the sleeve 132 has been rotated to the desired position the lock nut 134 is again tightened to clamp the sleeve in the adjusted position.

The operation of the device for trueing up brake bands and brake drums is the same as previously described in connection with the device 10.

From the foregoing description it will be apparent that we have provided a novel brake tool which is simple in construction, accurate, and efficient in use.

Having thus described our invention, we claim:

1. In a tool device, a base, said base having an aperture therein, a tool carriage, said carriage being movable on said base, means to retain said carriage in position on said base, a sleeve on said carriage, said sleeve being positioned in said aperture of said base, said sleeve having a bore therein, a shaft rotatably positioned in said bore, a drive shaft, means to support said drive shaft, means to operate said drive shaft, a gear secured to said tool carriage shaft, a gear on said drive shaft meshing with said first gear, said second gear being axially movable on said drive shaft and means connecting said second gear and said drive shaft whereby said second gear rotates with said drive shaft.

2. In a tool device, a base, said base having an aperture therein, a tool carriage, said carriage being movable on said base, means to retain said carriage in position on said base, means to secure said carriage in an adjusted position, a shaft rotatably supported by said carriage, means on said shaft to rotate said shaft, a boss on said base, a bearing sleeve rotatably mounted on said boss, means to secure said bearing sleeve in an adjusted position, said bearing sleeve including a bearing surface eccentric to the axis of said boss and means rotatably mounted on said bearing surface of said bearing sleeve to drive said tool carriage shaft rotating means.

3. In a tool device, a base, said base having an aperture therein, a tool carriage, said carriage being movable on said base, means to retain said carriage in position on said base, means to move said carriage, said means including a threaded stem, means to rotate said stem adjacent one end thereof, a bracket on said base having a threaded aperture therein, and said stem being positioned in said threaded aperture, a housing on said carriage, said housing having a recess therein, a head on said stem, said head being positioned in said housing recess, said head being rotatable in said recess and means to retain said head in position in said recess, means associated with said stem to secure said stem in an adjusted position, a sleeve on said carriage, said sleeve being positioned in said aperture of said base, said sleeve having a bore therein, a shaft rotatably positioned in said bore and means to operate said shaft.

4. In a tool device, a base, a groove in said base, said base having an elongated aperture therein communicating with said groove, a tool carriage, said carriage including a portion positioned in and movable in said groove, said carriage including a sleeve, said sleeve being positioned in said aperture, said sleeve having a bore therein, a shaft rotatably positioned in said bore, a gear housing, means to secure said housing to said sleeve to prevent relative axial movement thereof, said housing being rotatable on said sleeve, a drive shaft, means on said base to operate said drive shaft, a gear secured to said tool carriage shaft, a gear on said drive shaft meshing with said first gear, said second gear being axially movable on said drive shaft and means connecting said second gear and said drive shaft whereby said second gear rotates with said drive shaft.

5. In a tool device, a base, said base having an aperture therein, a tool carriage, said carriage being movable in said base, means to retain said carriage in position on said base, means to move said carriage, said means including a threaded stem, means to rotate said stem adjacent one end thereof, a bracket on said base having a threaded aperture therein, and said stem being positioned in said threaded aperture, a housing on said carriage, said housing having a recess therein, a head on said stem, said head being positioned in said housing recess, said head being rotatable in said recess and means to retain said head in position in said recess, means associated with said stem to secure said stem in an adjusted position, a sleeve on said carriage, said sleeve being positioned in said aperture of said base, said sleeve having a bore therein, a shaft rotatably positioned in said bore, a drive shaft, means to operate said drive shaft, a gear secured to said tool carriage shaft, a gear on said drive shaft meshing with said first gear, said second gear being axially movable on said drive shaft and means connecting said second gear and said drive shaft whereby said second gear rotates with said drive shaft.

6. In a tool device, a base, an undercut groove in said base, said base having an aperture therein communicating with said groove, a tool carriage, said carriage including a portion fitted in and movable in said groove, a sleeve on said carriage, said sleeve being positioned in said aperture of said base, said sleeve having a bore therein, a shaft rotatably positioned in said bore, a gear housing, said gear housing being rotatable on said sleeve, means to secure said gear housing to said sleeve to prevent relative axial movement thereof, means to secure said carriage in an adjusted position, a drive shaft, means to operate said drive shaft, a gear secured to said tool carriage shaft, a gear on said drive shaft meshing with said first gear, said second gear being axially movable on said drive shaft and means connecting said second gear and said drive shaft whereby said second gear rotates with said drive shaft, a boss on said base, said boss having an aperture therein, a plate, said plate having an apertured hub thereon, said hub being positioned on said boss and being rotatable thereon, means to retain said hub in position on said boss, clamping means associated with said boss and said plate to secure said plate in an adjusted position, said drive shaft operating means being mounted on said plate.

7. In a tool device, a base, an undercut groove in said base, said base having an aperture therein communicating with said groove, a tool carriage, said carriage including a portion fitted in and movable in said groove, means to move said carriage, said means including a threaded stem, means to rotate said stem adjacent one end thereof, a bracket on said base having a threaded aperture therein and said stem being positioned in said threaded aperture, a housing on said carriage, said housing having a recess therein, a head on said stem, said head being positioned in said housing recess, said head being rotatable in said recess and means to retain said head in position in said recess, means associated with said stem to secure said stem in an adjusted position, a sleeve on said carriage, said sleeve being positioned in said aperture of said base, said sleeve having a bore therein, a shaft rotatably positioned in said bore, a gear housing, said gear housing being rotatable on said sleeve, means to secure said gear housing to said sleeve to prevent relative axial movement thereof, means on said gear housing to secure said carriage in an adjusted position, a drive shaft, means to operate said drive shaft, a gear secured to said tool carriage shaft, a gear on said drive shaft meshing with said first gear, said second gear being axially movable on said drive shaft and means connecting said second gear and said drive shaft whereby said second gear rotates with said drive shaft, a boss on said base, said boss having an aperture therein, a plate, said plate having an apertured hub thereon, said hub being positioned on said boss and being rotatable thereon, means to retain said hub in position on said boss, clamping means associated with said base and said plate to secure said plate in an adjusted position, said drive shaft operating means being mounted on said plate.

8. In a tool device, a base, said base having an aperture therein, a tool carriage, said carriage being movable on said base, means to retain said carriage in position on said base, means to secure said carriage in an adjusted position on said base, a sleeve on said carriage, said sleeve being positioned in said aperture of said base, said sleeve having a bore therein, a shaft rotatably positioned in said bore, a pulley secured to said tool carriage shaft, a boss on said base, a bearing sleeve rotatably mounted on said boss, means to secure said bearing sleeve in an adjusted position, said bearing sleeve including a bearing surface eccentric to the axis of said boss, a pulley rotatably mounted on said bearing surface of said bearing sleeve and means connecting said first pulley and said second pulley.

9. In a tool device, a base, said base having an aperture therein, a tool carriage, said carriage being movable on said base, means to retain said carriage in position on said base, means to move said carriage, said means including a threaded stem, means to rotate said stem adjacent one end thereof, a bracket on said base having a threaded aperture therein, said stem being positioned in said threaded aperture, a housing on said carriage, said housing having a recess therein, a head on said stem, said head being positioned in said housing recess, said head being rotatable in said recess and means to retain said head in position in said recess, a sleeve on said carriage, said sleeve being positioned in said aperture of said base, said sleeve having a bore therein, a shaft rotatably positioned in said bore, means on said sleeve to secure said carriage in an adjusted position, a pulley secured to said tool carriage shaft, a boss on said base, a bearing sleeve rotatably mounted on said boss, means on said boss to secure said bearing sleeve in an adjusted position, said bearing sleeve including a bearing surface eccentric to the axis of said boss and means rotatably mounted on said bearing surface of said bearing sleeve to drive said pulley.

10. In a tool device, a base having an undercut groove thereon, said base having an aperture therein communicating with said groove, a tool carriage, said carriage including a portion fitted in and movable in said groove, means to move said carriage, said means including a threaded stem, means to rotate said stem adjacent one end thereof, a bracket on said base having a threaded aperture therein, said stem being positioned in said threaded aperture, a housing on said carriage, said housing having a recess therein, a head on said stem, said head being positioned in said housing recess, said head being rotatable in said recess and means to retain said head in position in said recess, a sleeve on said carriage, said sleeve being positioned in said aperture of said base, said sleeve having a bore therein, a shaft rotatably positioned in said bore, means on said sleeve to secure said carriage in an adjusted position, a pulley secured to said tool carriage shaft, a boss on said base, a bearing sleeve rotatably mounted on said boss, means on said boss to secure said bearing sleeve in an adjusted position, said bearing sleeve including a bearing surface eccentric to the axis of said boss, a pulley rotatably mounted on said bearing surface of said bearing sleeve and means connecting said first pulley and said second pulley.

11. In a tool device, a base, a tool carriage, said carriage being movable on said base, means to retain said carriage in position on said base, a shaft on said carriage, a drive shaft, means to support said drive shaft, means to operate said drive shaft, a gear secured to said tool carriage shaft and a gear on said drive shaft meshing with said first gear, said second gear being axially movable on said drive shaft.

12. In a tool device, a base, a tool carriage, said carriage including a portion adjustably movable on said base, a shaft rotatably mounted on said carriage, a drive shaft, means to operate said drive shaft, a gear secured to said tool carriage shaft, a gear on said drive shaft meshing with said first gear, and means enabling said second gear to drive said first gear in various adjusted positions of said tool carriage.

13. In a tool device, a support, means to mount said support for rotative movement, a tool carriage mounted for radial movement on said support, means to retain said carriage in position on said support, means to move said carriage, said means including a threaded stem, means on said stem to rotate the same, a threaded member mounted on said carriage engaging said threaded stem, said carriage having a bore therein, the axis of said bore being parallel to the axis of rotation of said support, a shaft rotatably positioned in said bore and adapted to receive a tool, and means to operate said shaft.

LESLIE R. MYERS.
OSCAR MAYER.